March 3, 1959  D. COLLINS  2,875,464
STALL AND REVERSE CIRCUIT FOR WINDSHIELD WIPER
Filed Aug. 27, 1953  3 Sheets-Sheet 1

*INVENTOR.*
DOUGLAS COLLINS
BY
ATTORNEY

March 3, 1959
D. COLLINS
2,875,464
STALL AND REVERSE CIRCUIT FOR WINDSHIELD WIPER
Filed Aug. 27, 1953
3 Sheets-Sheet 2
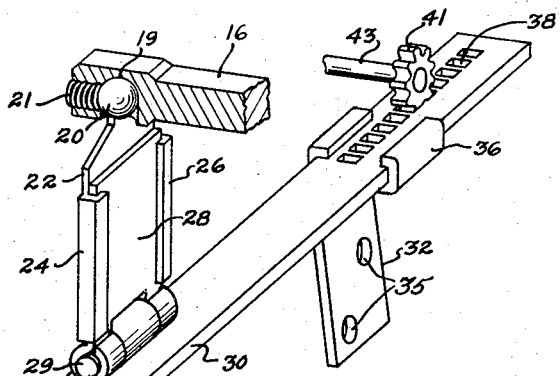
FIG. 3.
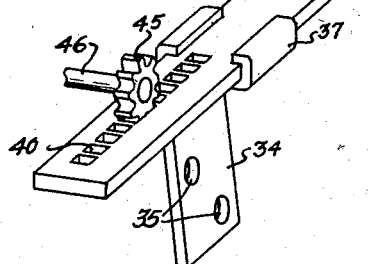
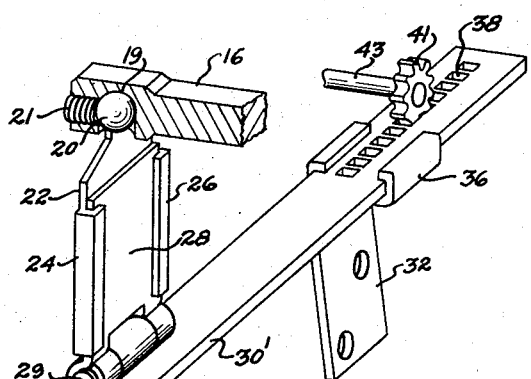
FIG. 4.
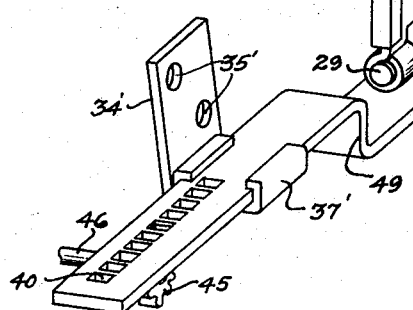
INVENTOR.
DOUGLAS COLLINS
BY
*Laurence M. Goodridge*
ATTORNEY.

March 3, 1959 D. COLLINS 2,875,464
STALL AND REVERSE CIRCUIT FOR WINDSHIELD WIPER
Filed Aug. 27, 1953 3 Sheets-Sheet 3

INVENTOR.
DOUGLAS COLLINS
BY
Laurence M. Goodridge
ATTORNEY

United States Patent Office 2,875,464
Patented Mar. 3, 1959

2,875,464

STALL AND REVERSE CIRCUIT FOR WINDSHIELD WIPER

Douglas Collins, Salisbury, N. C.

Application August 27, 1953, Serial No. 376,894

17 Claims. (Cl. 15—253)

This invention relates to electric windshield wiper drive mechanisms and, more specifically, to a novel arrangement of parts in such a mechanism for driving windshield wipers by a reversible electric motor, wherein the same motor control which reverses the direction of movement of the wipers at the end of each stroke is operative during overload or stalling in any intermediate part of the stroke.

Most types of windshield wipers are satisfactory in operation under ordinary conditions to provide a windshield with reasonable visibility, but all types now in general use fail under extremely adverse conditions to provide the same degree of visibility when called upon to combat heavy, wet snow and sleet. This is so even with the usual defrosting mechanism in operation applying heat to the inside surface of the windshield. Nevertheless, the blades will often stall under the load, or temporarily freeze to the glass, until sufficient heat from the defroster melts the snow or ice to free the blades. From personal observation, I believe that this phenomenon may be caused by the fact that the blade proper is not heated, or that the local temperature at the surface of the glass is below freezing. Whatever the cause, the stalling of the blades seriously impairs visibility, and is dangerous in that it occurs often without warning.

To prevent damage to the wipers and drive mechanism it is conventional practice to incorporate therein an overload clutch, or a like mechanism. Such a mechanism, however, will not operate the wipers after they become stalled. The purpose of the clutch is to protect the motor from being burned out due to a temporary overload on the drive mechanism.

The present invention overcomes this disadvantage since, when the wipers stall, the drive motor will be automatically reversed so that the wipers will continue to operate from one end of their stroke up to the point of stall to keep this area clear and provide at least limited visibility. The operation of the wipers within this limited area will continue until the obstruction is removed, usually by subsequent strokes of the wiper against the obstruction, whereupon the blades resume normal operation over the area cleared by a full stroke of the wipers.

The present invention provides a more powerful wiping action than present systems because the transmission from the motor gives greater mechanical advantage through what amounts to a large gear reduction. Consequently, a small, high-speed electric motor is adequately powerful in such a system. The control circuit provided for the motor is also novel in that it will reverse the motor when the blades are stalled by a resilient abutment at the end of each stroke, or by snow or ice during that stroke. This control circuit may be used with any shunt-wound motor in existing systems to produce the same result, and with some obvious modifications may apply to a series-wound type of motor.

In order that one skilled in the art will understand the invention, several embodiments are disclosed in detail for the purposes of illustration.

In the drawings,

Fig. 3 is a detailed view in perspective of a part of the drive mechanism.

Fig. 4 is a detailed view in perspective of a modification of the same drive system.

Figure 1:
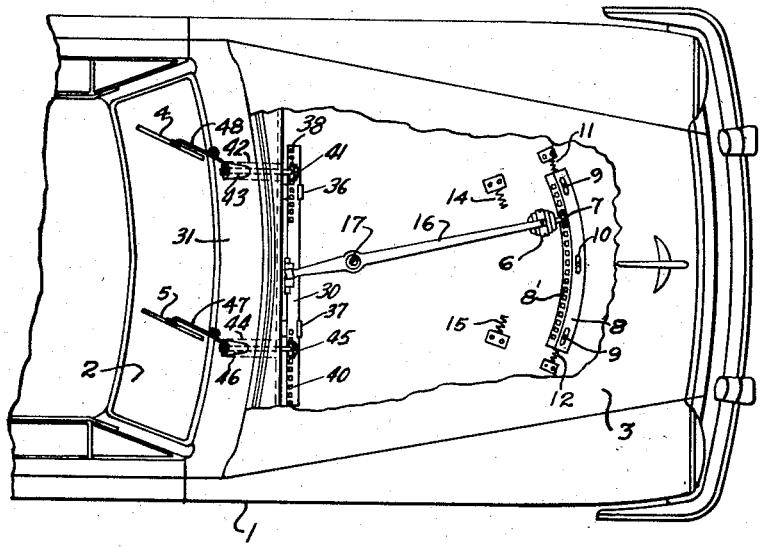
Fig. 1 is a top plan view with parts broken away to illustrate the invention.

According to this invention, the windshield wiper and its drive means are applied to a motor vehicle in the manner shown in Fig. 1. The body of the motor vehicle 1 has been partly broken away to illustrate the application of the invention, and is here provided with a hinged panel 3 covering the engine compartment of the motor vehicle. Panel 3 is mounted about a linkage at its rearward edge (not illustrated) but in the usual manner. Under panel 3 is a reversible electric motor 6 mounted on a swinging arm 16. Sprocket 7 on the motor shaft engages an arcuate rack 8 provided with teeth 8' formed in one flange of a Z-shaped section. The opposite flange is secured to the panel 3 by rivets 9 projecting through slots 10. This connection between the Z-shaped rack and the hood panel 3 provides for limited endwise motion of the rack 8 with respect to the body panel 3. This endwise motion is opposed by resilient elements 11 and 12 in the form of coil springs abutting the ends of the rack and suitable brackets secured to the panel 3.

Arm 16, which supports the motor 6 is hinged to the hood panel 3 at 17, and the arc of swing of the arm 16 is limited by similar resilient stops 14 and 15 suitably positioned for this purpose on the hood panel 3.

Figure 2:
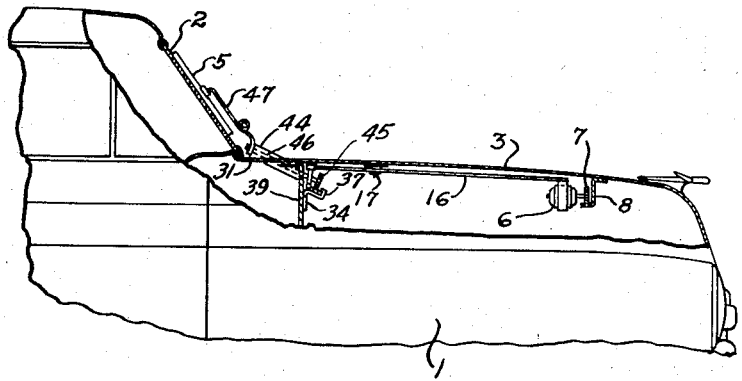
Fig. 2 is a side elevational view with parts broken away to illustrate the application of the invention to a motor car.

Turning now to Fig. 3, it will be seen that the opposite end of the arm 16 is provided with a socket 19 receiving a ball 20 secured within the socket 19 by a set screw 21. Ball 20 is an integral part of a telescoping link in which one part thereof 22 has integral guides 24 and 26 providing re-entrant opposite guides for the other portion of the telescoping link 28. A hinge 29 connects this portion of the link with rack bar 30, which is, in turn, supported for sliding movement by a pair of brackets 32 and 34 having guides 36 and 37, respectively. These brackets are provided with suitable bolt-receiving holes 35, so that they may be properly positioned on the fire wall 39 in the manner shown in Fig. 2. Rack teeth 38 and 40 in opposite ends of the rack bar 30 drivingly engage gears 41 and 45 on wiper drive shafts 43 and 46, respectively. Wiper drive shafts 43 and 46, respectively, are appropriately mounted for rotation about their longitudinal axes in tubular housings 42 and 44, which are fixed to extend through the cowling 31 of the car body. Spring arms 47 and 48 are fixed at one end thereof, respectively, to the upper ends of wiper drive shafts 46 and 43. To the other ends of spring arms 47 and 48 are fastened wipers 5 and 4, by any conventional means.

So far, a mechanism has been described wherein the motor 6 driving the sprocket 7 will traverse the Z-shaped rack bar 8 to oscillate the arm 16. The degree of oscillation of the arm is controlled by resilient stops 14 and 15. Oscillation of the arm 16 will reciprocate the rack bar 30 through the universal connection 19 and 20 and telescoping link 22, 28. This movement of the rack bar 30 will be transmitted through gears 41 and 45, respectively, to rotate shafts 43, 46 through the rack and gear arrangement. This motion of the shafts 43 and 46 will oscillate the spring arms 47, 48 simultaneously in the same direction to move the wiper blades 4 and 5 across the windshield 2.

The resilient stops 14 and 15 may be adjustably mounted so as to control the length of the stroke of wipers 4 and 5. The control circuit for the motor 6, which will be described later, is responsive to the resistance of the stop members when they are compressed by the arm 16 to reverse the electric motor 6 at each end of the wiper stroke.

Fig. 4 illustrates a modification of that portion of the drive in Fig. 3 so arranged as to operate the wiper blades 4 and 5 in opposite directions. These two structures of Fig. 3 and of Fig. 4 are substantially identical, and can be best described by laying emphasis on the differences between the two. The same reference characters have been used to indicate like parts. In Fig. 4, the rack bar 30' is formed with an offset 49, so that the teeth 40 of the rack overlie the gear 45. This change requires a suspension type of guide bracket indicated as 34' with re-entrant facing flanges 37' to slidably retain the offset portion of the rack bar 30'.

Engagement between the rack bar pivot 40 and the gear 45 is thus reversed from that shown in Fig. 3, so that the gears 41 and 45 are oppositely rotated by the rack bar 30' to rotate shafts 43 and 46 and oscillate the wiper blades 4 and 5 simultaneously in opposite directions. Otherwise, this structure is the same as that shown in Fig. 3.

Figure 5:
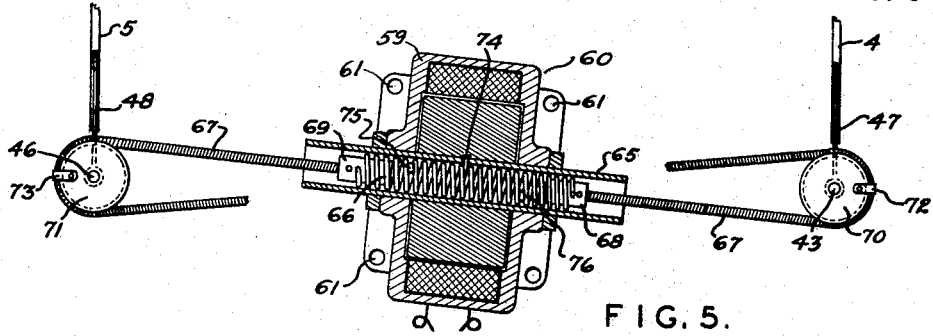
Fig. 5 is a front elevational view of another embodiment of the drive mechanism.

Fig. 5 is a somewhat diagrammatic view of a modification of the drive mechanism which can be produced simply and cheaply from parts that are readily available. In this view, a conventional, reversible type electric motor 60 with a tubular armature shaft 65 is employed. Motor 60 has a casing 59 with bolt holes 61, whereby the motor casing 59 can be secured to the fire wall 39 of the car body in a central position relative to the wiper drive shafts 43 and 46. Within the tubular armature shaft 65 of the electric motor 60 is slidably mounted a coiled drive spring 66 which is of a diameter to snugly fit in the tubular shaft 65. Spring 66, in turn, is coupled to a looped driving spring 67 by two coupling members 68 and 69 which are provided with sockets for receiving the opposite inturned ends of the coiled spring 66. The driving spring 67 extends from the coupling 68 about a grooved pulley 70 fixed to the lower end of shaft 43, and thence from any suitable form of guide such as a grooved roller (not shown) past the electric motor 60 to an opposite pulley 71 fixed to the lower end of shaft 46. Each pulley, 70 and 71, is provided with a spring clamping device 72 and 73, respectively, which transmits a positive drive from the driving spring 67 to each pulley. The opposite end of spring 67 is connected to the coupling member 69, so that the spring 67 forms a continuous loop from one end of drive spring 66 around the pulleys 70 and 71 to the opposite end of drive spring 66.

Within the tubular armature shaft 65 is a depending finger 74 which meshes between the helices of the drive spring 66. Fixed to the drive spring 66 are a pair of stops 75 and 76.

The spring 67 in this device is a relatively flexible spring in order to pass around the pulleys, but, on the other hand, is tightly looped in order to resist torsional forces from the driving motor 60. In operation, rotation of the armature in either direction drives the depending finger 74 in a fixed circular path. The engagement of this finger between the helices of the drive spring 66 produces translation of the spring axially of the motor in one direction or the other, depending on the direction of rotation. Translational movement of the drive spring is transmitted to each of the wiper blades 4 and 5 through the looped spring 67, which, as described above, is clamped in driving engagement with the respective pulleys 70 and 71. When the blades 4 and 5 move to a position near their extreme ranges of oscillation in either direction, finger 74 will engage one or the other of the stops 75 or 76, fixed to drive spring 66, thus tending to rotate the springs 66 and 67 in one direction or the other against the resistance of clamps 72 and 73. The inherent resistance of these springs to torsion will increase the load of the motor which will cause the control circuit provided for that motor to reverse the direction of rotation of the armature. A control circuit suitable for this purpose is disclosed in Fig. 6.

Figure 6:
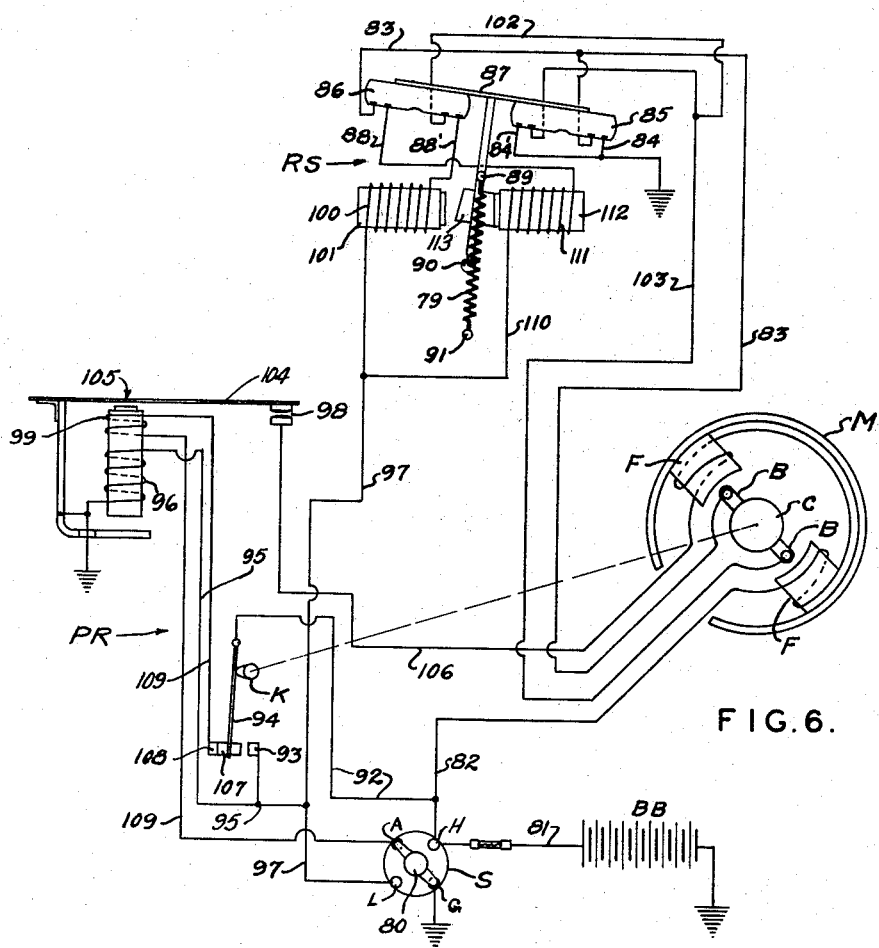
Fig. 6 is a diagrammatic view illustrating the electrical circuit.

In Fig. 6 is, diagrammatically shown, one modification of a control circuit for the electric motors shown in the previous embodiments of this invention. This circuit will reverse the electric motor in the above described mechanisms in response to unusual increase in load, and also provide a parked position for the wiper blades at one extreme of either stroke.

This circuit illustrates the motor to be controlled as M, and the system comprises a main switch indicated as S which can be mounted on the instrument control panel of the car body. A parking switch and relay PR and an overload reversing switch RS may be combined in one casing and also mounted in the body, preferably adjacent one of the shafts 43 or 46. The motor M diagrammatically illustrated here is a shunt-wound type with brushes B for a commutator C on the armature. Motor M has a field illustrated by the poles F. In this type of motor, the direction of rotation can be reversed by reversing the flow of current in either the field or armature, and it can be abruptly brought to a stop to position the wiper arms in a parked position by grounding the brushes when the field coils F are energized. In order to do this, a cam K has been shown driven by the armature, but it should be understood that this is merely a diagrammatic illustration of a principle of operation which requires a cam driven in synchronism with the rotation of motor M. In actual practice, it would be desirable, in carrying out this principle, to have the cam K driven by one of the windshield wiper shafts 43 or 46, respectively.

The control circuits for carrying out the above functions are two in number—one for operating the motor in alternate directions, and the other for operating the motor to move the wiper blades to the parked position, and open the circuit. These two circuits are alternately energized by the switch S. Within the switch S are two pairs of terminals which may be connected alternatively to connect the control circuits with the battery, as will be clear from an inspection of Fig. 6. Therein, the switch S is shown in the position connecting the terminals A and G, which is the "off" or "parked" position of the control circuit, but, by turning the knob 80 clockwise, the switch may be operated to close the terminals H and L, which is the "on" position for operating the motor in alternate directions.

Since an explanation of the circuit for driving the motor with the switch in the "on" position will facilitate an understanding of the operation of the circuit for moving the blades to the "parked" position, the circuit with terminals H and L connected will first be described. This operating circuit includes connections for energizing the field and the armature of the motor M. The field connections are to the terminal H of the switch S, while the armature connections are to the terminal L. The field circuit leads from the battery BB through a fuse to the terminal H by way of lead 81. Lead 82 connects terminal H with the field windings on poles FF of the motor M, and thence by way of lead 106 with contacts 98 of the grounded armature 104 of relay 105. A lead 92 connects terminal H with switch arm 94, which is intermittently moved from its normal position to that shown in Fig. 6 by the oscillation of the cam K. The purpose of this connection will be explained subsequently.

Relay 105, which controls the field circuit of poles F, F of the motor M, is energized during the operation of the motor in response to the connection of the terminal L with the battery BB through the switch S, which is, in this case, a part of the motor armature circuit. In this circuit power will flow from the battery through the lead 97 to connecting lead 95, relay winding 96, to ground. This will energize the relay winding 96, closing relay 105 and contacts 98 to ground the field circuit of coils F, F. Lead 97 also extends to a winding 100 on electro-magnet 101, and thence by way of lead 88' to one terminal of a mercury switch 86. With the switch in the position shown in Fig. 6, lead 88' is connected to lead 102 and 103 to one brush B of motor M. The other brush B is connected with ground through the lead 83, mercury switch 85, and lead 84. The separate mercury switches 85 and 86 of switch RS are mounted on a rocking support 87. This support is held either in one position, as shown in Fig. 6, or in an oppositely inclined position, by the tension of an over-centered spring 79 connected between a point 89 on support 87 above pivot 90 and a fixed member 91 below the pivot. In the position shown in Fig. 6, support 87 is inclined to the right so that the circuit is completed as above described.

In the opposite inclined position of the switch RS, the current is reversed through the armature circuit, and power from the battery will now flow from lead 97 through lead 110 into winding 111 on the electro-magnet 112, and thence by lead 88 through switch 86 to lead 83, which connects with the upper brush B of the motor M. Lower brush B is connected with ground by lead 103 through switch 85 and lead 84'.

The tilting action of the switch RS alternately opens first one pair of circuits and then another pair of circuits, producing the reversing of the current flow to the brushes B of the motor M. The reversing action is accomplished by the electro-magnets 101 and 112 acting on an armature 113 integral with tilting support 87. During normal operation of the motor M in one direction, as illustrated in Fig. 6, the flow of current from battery BB through the winding 100 of electro-magnet 101, is insufficient to draw switch armature 113 away from its position against magnet 112 due to the resistance of spring 79. If, during operation of the motor M, the load on the motor increases during or at the end of the stroke of the blades 4 and 5, then the flow of current through winding 100 will likewise increase. When this happens, electro-magnet 101 overpowers the resistance of the spring 79 to rock the support 87 into the oppositely inclined position from that shown in Fig. 6. This opens the circuit through the electro-magnet 101, and closes the circuit through the electro-magnet 112, at the same time reversing the direction of flow of current to the motor armature. The action of the electro-magnet 112 is also insufficient to draw switch armature 113 back during normal operation of the motor M. Thus, each time the load on the motor increases, due to the load on the wiper blades or due to the resistance of stops 14 and 15, rockable support 87 will shift its position due to the influence of the electro-magnets 101 and 112. The electro-magnets 101 and 112 may be of the species illustrated in the drawings, or may be solenoids with movable cores acting on the switch element 87. One construction would obviously be considered as the mechanical equivalent of the other for the purpose described.

The circuit for operating the motor to move the wiper blades to the "parked" position is controlled by the switch S, connecting contacts A and G. When the knob 80 is moved to position the switch in the "off" position, as shown in Fig. 6, the motor M will continue to run so long as contacts 93 and 107 of switch 94 are closed, because main lead 97 of the armature circuit will be energized through branch lead 92, switch arm 94, and lead 95. However, when the wiper blade is near the end of this stroke, cam K will open the circuit to the armature by moving switch arm 94 away from contact 93. The motor will continue to coast, however, until switch 94 closes contacts 107 and 108. When this happens, both brushes B of the motor will be grounded while the field coils F, F remain energized to bring the motor M to a complete stop, since battery B, B is now connected through lead 92, switch arm 94, contacts 107 and 108 by conductor 109 to coil 99 to retain relay switch 98 closed.

With switch contacts 107 and 108 now closed, the armature circuit is as follows: As shown in Fig. 6, upper brush B will be grounded by way of lead 83 through switch 85 to lead 84. Lower brush B will also be grounded by way of lead 103, 102, switch 86, lead 88', winding 100, lead 97, lead 95', coil 96 to ground. Relay 105 will remain closed, due to the energization of winding 99, thereby maintaining contacts 98 closed to energize the field of motor M from terminal H. It will be realized that if the cam K is driven from the shafts 43 or 46, the final position will always be uniform between the blades 4 and 5 and the windshield.

A structure has been described which will carry out all the objects set forth in the above description. As illustrated in the drawings, the invention is capable of being carried into effect by many distinct embodiments, of which only a few are illustrated. The scope of the appended claims should therefore be construed according to the brief description, and not restricted to specific illustrations.

I claim:

1. A drive for an oscillating windshield wiper comprising a reversible electric motor, a resilient transmission mechanism between said motor and said wiper, and a control circuit for said motor including a reversing switch, mechanical means for holding said switch closed, an electric means in said switch responsive to the flow of current to said motor for overcoming the resistance of said mechanical means for actuating said switch to reverse said motor and operating direction of said wiper.

2. The combination defined in claim 1 in which said mechanical means comprises an over-centered spring mechanism in said switch.

3. The combination defined in claim 1 in which said electric means in said switch responsive to the flow of current to said motor comprises a pair of opposed solenoids alternately connected in the power circuit to said motor by said switch.

4. A drive for an oscillating windshield wiper comprising a reversible electric motor, a transmission mechanism between said motor and said wiper, stops for limiting the stroke of said wiper, resilient elements associated with said motor to minimize the shock of said stroke limiting stops on said drive, and a control circuit for said motor including a reversing switch, mechanical means for holding said switch closed, and electric means in said switch responsive to the increased flow of current to said motor when stalled by said stops for overcoming the resistance of said mechanical means to actuate said switch for reversing said motor.

5. The combination defined in claim 4 in which the said mechanical means comprises an over-centered spring connected to said switch and a fixed abutment.

6. The combination defined in claim 4 wherein said electric means in said switch responsive to the flow of current to said motor comprises opposed solenoids on opposite sides of a switch arm alternately connected into said motor circuit by operation of said switch.

7. In a drive for a wiper mechanism, the combination of a reversible electric motor, and a load sensitive reversing switch for the control circuit of said motor comprising a multi-pole switch, an electric actuating mechanism for said switch, and mechanical means calibrated to resist actuation of said switch during rotation of said motor in either direction.

8. In a drive for a wiper mechanism, the combination of a reversible electric motor and a load sensitive reversing switch for the control circuit of said motor comprising a multi-pole switch, an electric actuating mechanism connected with the motor circuit through said switch, and mechanical means calibrated to resist actuation of said switch during rotation of said motor in either direction.

9. In an electric driven wiper motor control circuit, the combination of a load sensitive reversing switch for said control circuit for said motor including a multi-pole switch, an electric actuated mechanism connected with said control circuit through said switch, and mechanical means calibrated to resist actuation of said switch by said mechanism comprising an over-center mounted springs and connections for said spring on said switch.

10. The combination, with a motor vehicle body, a window in said body, and a hinged panel in said body adjacent said window, of a power driven wiper mechanism for said window comprising a motor mounted on said panel, a transmission between said wiper mechanism and said motor mounted on said body, and a flexible power connection in said transmission adjacent the hinge line of said panel.

11. The combination with a motor vehicle body, a window in said body, and a hinged panel in said body adjacent said window, of a power driven wiper mechanism for said window, comprising a motor mounted on said panel, a transmission between said wiper mechanism and said motor mounted in part on said panel, and a flexible power connection in said transmission adjacent the hinge line of said panel.

12. The combination with a motor vehicle body, a window in said body, and a hinged panel in said body adjacent said window, of a power driven wiper mechanism for said window, comprising a transmission mechanism for said wiper mechanism mounted in part beneath said panel, a motor on said transmission, a gear on said motor, a gear on said panel engaged by said motor gear, and a flexible power connection in said transmission adjacent the hinge line of said panel.

13. The combination with a motor vehicle body, a window in said body, and a hinged panel in said body adjacent said window, of a power driven wiper mechanism for said window, comprising a transmission for said wiper mechanism, a motor mounted on said transmission, a gear driven by said motor, gearing resiliently mounted on said body engaged by said motor driven gear, and a flexible power connection in said transmission adjacent the hinge line of said panel.

14. The combination with a motor vehicle body, a window in said body, and a hinged panel in said body adjacent said window, of a power driven wiper mechanism for said window, comprising a motor on said panel, transmission between said wiper mechanism and said motor, including an oscillating arm pivoted on said panel, a reciprocating rack slidably mounted on said body, and a flexible power connection in said transmission adjacent the hinge line of said panel.

15. A drive for an oscillating windshield wiper comprising a reversible electric motor with a tubular armature shaft, a transmission mechanism between said motor and said wiper, including a threaded member in said shaft, stops associated with said member, and a control circuit for said motor responsive to the action of said stops for reversing said motor and thereby the operating direction of said transmission mechanism.

16. A drive for an oscillating windshield wiper comprising a reversible electric motor with a tubular armature shaft, a transmission mechanism between said motor and said wiper, including a spring in said shaft, a finger driven by said shaft engaging said spring, a flexible torsionally resilient connection between said spring and said wiper, stops associated with said transmission, and a control circuit for said motor responsive to the action of said stops on said resilient connection for reversing said motor and thereby the operating direction of said transmission.

17. The combination with a motor vehicle body, a window in said body, and a hinged panel in said body adjacent said window, of a wiper mechanism for said window and a drive for said wiper, comprising a reversible motor mounted on said panel, a transmission between said wiper and said motor mounted on said body, a flexible power connection in said transmission adjacent the hinge line of said panel, stops for limiting the stroke of said wiper and thereby arresting rotation of said motor, and a control circuit for said motor including a reversing switch, mechanical means for holding said switch closed, an electric means in said switch responsive to increase in load imposed on said motor by the stroke limiting action of said stops on said wiper for overcoming the resistance of said mechanical means to actuate said switch to reverse said motor and thereby the operating direction of said wiper.

References Cited in the file of this patent

UNITED STATES PATENTS

| | | |
|---|---|---|
| 1,608,985 | McCaleb | Nov. 30, 1926 |
| 1,648,680 | Given | Nov. 8, 1927 |
| 2,105,514 | Welch | Jan. 18, 1938 |
| 2,356,828 | Crane et al. | Aug. 29, 1944 |
| 2,499,298 | Christensen | Feb. 28, 1950 |
| 2,511,946 | Sacchini | June 20, 1950 |
| 2,528,181 | Sacchini | Oct. 31, 1950 |
| 2,548,709 | Drexler | Apr. 10, 1951 |
| 2,568,922 | Malone | Sept. 25, 1951 |
| 2,593,355 | Sivacek | Apr. 15, 1952 |
| 2,611,116 | Latta et al. | Sept. 16, 1952 |